United States Patent
Scheibenreif et al.

(10) Patent No.: US 7,566,175 B2
(45) Date of Patent: Jul. 28, 2009

(54) FERRULE FOR OPTICAL FIBER CONNECTOR

(75) Inventors: Joseph Scheibenreif, Oswego, IL (US); Seng-Kum Chan, Santa Clara, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/353,556

(22) Filed: Feb. 14, 2006

(65) Prior Publication Data
US 2007/0189674 A1 Aug. 16, 2007

(51) Int. Cl.
*G02B 6/36* (2006.01)
(52) U.S. Cl. .......................... 385/78; 385/55
(58) Field of Classification Search ........................ None
See application file for complete search history.

(56) References Cited

U.S. PATENT DOCUMENTS

| | | | | | |
|---|---|---|---|---|---|
| 5,259,059 | A | * | 11/1993 | Abramov | 385/123 |
| 5,764,836 | A | * | 6/1998 | Roff | 385/88 |
| 5,940,561 | A | * | 8/1999 | Dean et al. | 385/60 |
| 6,283,643 | B1 | * | 9/2001 | Serizawa | 385/81 |
| 6,550,979 | B1 | * | 4/2003 | Fleenor et al. | 385/78 |
| 6,599,029 | B2 | * | 7/2003 | Yamazaki et al. | 385/80 |
| 6,877,908 | B2 | * | 4/2005 | Nakanishi et al. | 385/78 |
| 7,031,576 | B2 | * | 4/2006 | Deane | 385/49 |
| 7,195,400 | B2 | * | 3/2007 | Asano et al. | 385/78 |
| 7,195,401 | B2 | * | 3/2007 | Moll et al. | 385/88 |
| 7,387,448 | B2 | * | 6/2008 | Kohda | 385/85 |
| 2002/0034361 | A1 | * | 3/2002 | Kashihara et al. | 385/50 |
| 2002/0034362 | A1 | * | 3/2002 | Yamazaki et al. | 385/80 |
| 2002/0176669 | A1 | * | 11/2002 | Okamoto | 385/80 |
| 2003/0031426 | A1 | * | 2/2003 | Nakanishi et al. | 385/78 |
| 2005/0018969 | A1 | * | 1/2005 | Deane | 385/49 |
| 2005/0220424 | A1 | * | 10/2005 | Asano et al. | 385/78 |

* cited by examiner

*Primary Examiner*—Frank G Font
*Assistant Examiner*—Peter Radkowski

(57) ABSTRACT

The present invention provides a ferrule comprising a housing for the stripped end of an optic fiber, and at least one notch and/or protrusion on the outer surface of the ferrule. The present invention further provides a support comprising at least one protrusion and/or groove mating with at least one notch and/or protrusion respectively, on the outer surface of the ferrule for aligning the ferrule and preventing motion (rotational and translational) of the ferrule relative to the support. In various embodiments, the orientation of the optic fiber is fixed with respect to the at least one notch and/or protrusion.

20 Claims, 3 Drawing Sheets

FERRULE FOR OPTICAL FIBER CONNECTOR

FIELD OF INVENTION

The present invention relates to optical fiber connectors. More particularly, the present invention relates to ferrules used in the optical fiber connectors.

BACKGROUND OF THE INVENTION

Optical fibers find extensive use for transmission of light for digital communications by modulating light signals to convey data or information. The fibers are fragile and have extremely small diameters. Typically, the optical fibers are coupled to a light transmitting device at one end, and light receiving device at the other end. The ends of the fibers may also be coupled in an end-to-end relationship with other mating fibers. In order to provide reliable coupling and ensure high efficiency in the transfer of light or light signals, it is critical that the ends of the optical fibers be precisely aligned with the ends of other fibers or devices to which they are coupled.

It is known in the art to use ferrules to provide a mechanically robust mount for holding optical fibers in a desired position. The ferrule is usually a rigid tube that aligns and protects the stripped end of a fiber. Such ferrules are typically made by cutting glass tubes of desired thickness and having a hole at the center, extending through the longitudinal axis of the ferrule. Optical fibers are passed through these holes in the ferrules.

The ferrules are held in a housing or support to place them at a desired position and facilitate proper alignment of optical fibers in the connector. Since the optical fibers are very fragile, it is necessary that the ferrule should not rotate, as the rotation of the ferrule would damage the optical fibers extending from the ferrule. Further, translational motion of the ferrule may also cause damage to the optical fibers. Thus, there is a need for a mechanism that addresses the aforesaid concern and ensures that the ferrule is held firmly in the housing or support.

SUMMARY OF THE INVENTION

According to one embodiment of the present invention, a ferrule comprises a housing for the stripped end of an optical fiber and at least one notch on the outer surface of the ferrule suitable for aligning the ferrule and preventing motion (rotational and translational) of the ferrule relative to a support.

Another embodiment of the present invention relates to a ferrule and support combination. The ferrule and support combination comprises of a ferrule having a housing for the stripped end of an optic fiber. The ferrule has at least one notch on the outer surface. The support comprises at least one protrusion mating with at least one notch on the outer surface of the ferrule for aligning the ferrule and preventing motion (rotational and translational) of the ferrule relative to the support.

According to yet another embodiment of the present invention, a ferrule comprises a housing for the stripped end of an optic fiber, and at least one protrusion on the outer surface of the ferrule suitable for aligning the ferrule and preventing motion (rotational and translational) of the ferrule relative to the support.

According to still another embodiment of the present invention, a ferrule and support combination comprises a ferrule comprising a housing for the stripped end of an optic fiber, and at least one protrusion on the outer surface of the ferrule, and a support for aligning the ferrule and preventing motion (rotational and translational) of the ferrule relative to the support.

In accordance with yet another embodiment of the present invention, the support further comprises at least one clamp mating with at least one protrusion on the outer surface of the ferrule. In accordance with still another embodiment of the present invention, the support contains a groove mating the protrusion of the ferrule to prevent the ferrule from rotating. Further, the protrusion on the ferrule may be retractable.

DETAILED DESCRIPTION OF THE INVENTION

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

Figure 1:
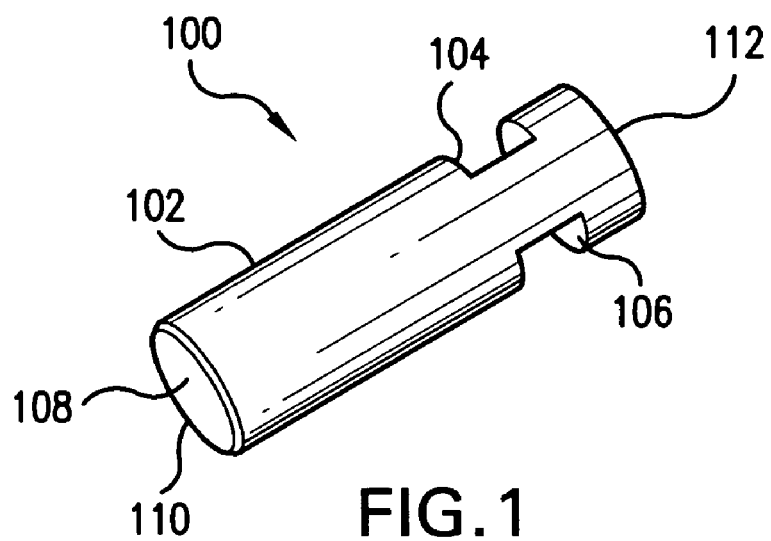
FIG. 1 illustrates a ferrule bearing notches in accordance with an embodiment of the present invention.

FIG. 1 illustrates a ferrule bearing notches on its outer surface according to one embodiment of the present invention. The ferrule is a rigid tube usually having a circular cross-section.

The ferrule 100 comprises of a housing 102 for seating an optic fiber. The housing 102 is a cylindrical structure having a front-end portion 110, a central longitudinal bore for receiving an optical fiber therein and a back-end portion 112. The front-end portion 110 of the ferrule 100 contains at least one hole 108 along the insertion direction of the optical fiber. The back-end portion 112 of the ferrule contains a receptacle to seat the stripped end of the optical fiber. The hole in the front-end portion 110 and the receptacle in the back-end portion 112 of the ferrule are connected through the central longitudinal bore. The stripped end of the optical fiber is inserted in back-end portion 112 in a manner that the stripped portion of the optical fiber passes through the central longitudinal bore to optically couple with hole 108. The front and back-end portions, 110 & 112 of the ferrule 100, can be tapered or straight. The precise external shape of the front and back-end portions 110 & 112 of the ferrule and any alignment surfaces will be determined by the need for matching the type of optical fiber connector employed.

The ferrule 100 further comprises of two notches 104 and 106 present on the housing 102 of the ferrule 100. The notches 104 and 106 are used to align the ferrule 100 and prevent motion (rotational and translational) of the ferrule 100 relative to a support (not shown in FIG. 1). The notches 104 and 106 also limit the translational movement of the ferrule 100. Further, the orientation of the optical fiber with respect to the notches 104 and 106 is fixed. This is useful in applications requiring either a polarizing fiber or polarization maintaining fiber (PMF). The notches 104 and 106 hold ferrule 100 in housing 102 such that the preferred ("fast" or "slow") axis of the optical fiber lies either perpendicular or parallel to housing 102. The notches may be conical, square, circular or semi-circular.

The ferrule 100 may be made from a ceramic material, however, there are no particular limitations on materials for the ferrule and it can be made from stainless steel, resins, metal, plastic and glass. Further, since an optic fiber end has a domed annular surface, in order to achieve good optical coupling into the optical fiber, the fiber end and the end portions of the ferrule are polished together to sub-micron smoothness.

The aforesaid embodiment describes a ferrule with two notches by way of example, without limiting the scope of the present invention. It would be apparent to one skilled in the art that one or more notches may be bored on the surface of the ferrule without deviating from the spirit and scope of the present invention. In an embodiment of the present invention, the notches can be placed on the outer surface and along the axis of the ferrule at regular intervals. In another embodiment of the present invention, the notches can be placed on the outer surface and along circular cross-section of the ferrule at regular intervals. In yet another embodiment of the present invention, the notches can be placed on the outer surface and along the axis of the ferrule at regular intervals.

Figure 2:
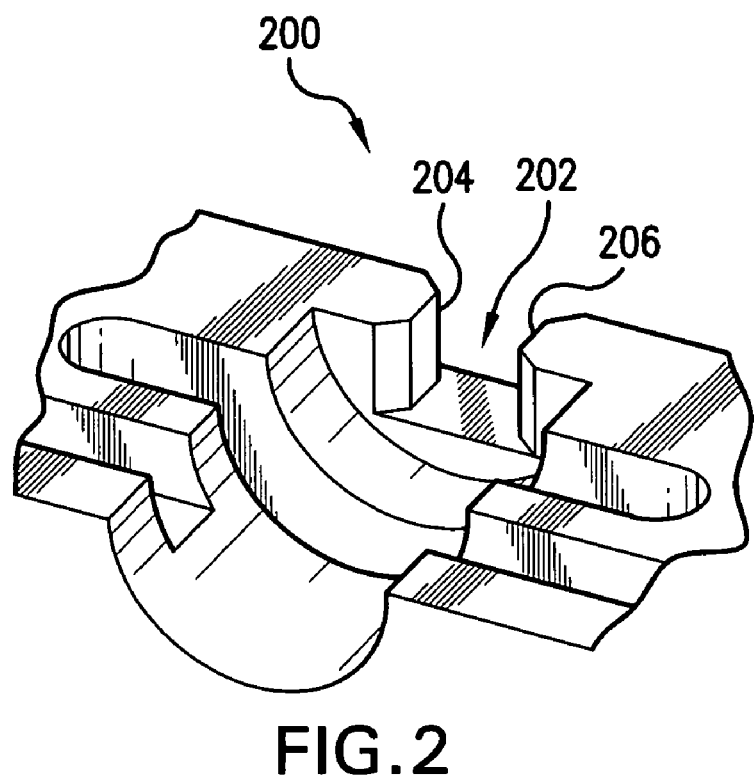
FIG. 2 is an illustration of a portion of a support in accordance with an embodiment of the present invention.

FIG. 2 is an illustration of a portion of a support 200 in accordance with an embodiment of the present invention. Support 200 contains a cavity 202 for holding the ferrule. Support 200 also contains two protrusions 204 and 206, placed opposite to each other, which extend in the direction of the cavity 202. The protrusions 204 and 206 fit in the notches of the ferrule 100 to hold the ferrule firmly. In various embodiments, the number of protrusions in the support 200 may correspond with the number of notches in a ferrule.

In one embodiment of the present invention, a support may have two flaps, namely, a top and a bottom flap, such that the ferrule is encapsulated within the two flaps. In an alternate embodiment, the support can be a tubular structure with retractable protrusions to facilitate insertion of the ferrule in the cavity.

Figure 3:
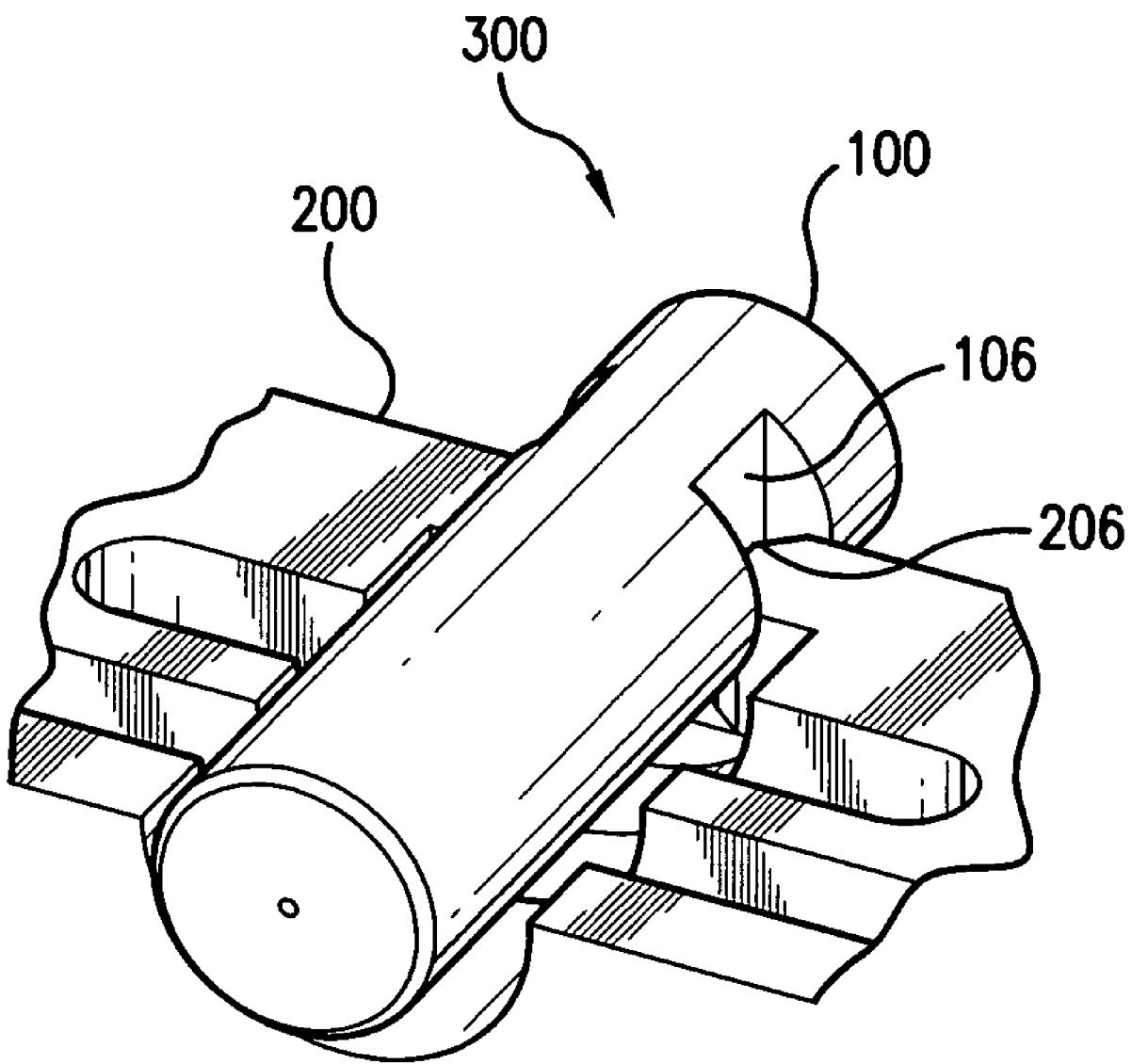
FIG. 3 is an illustration of a ferrule-support assembly in accordance with an embodiment of the present invention.

FIG. 3 is an illustration of a ferrule and support assembly 300 in accordance with an embodiment of the present invention. Assembly 300 illustrates ferrule 100 with notches 104 (not shown in Figure) and 106 placed in support 200. Protrusions 204 (not shown in Figure) and 206 of support 200, described with respect to FIG. 2, fit in the notches 104 and 106, respectively, of the ferrule 100. Ferrule 100 is thereby, held firmly in support 200 to prevent motion (rotational and translational) of ferrule 100 relative to support 200.

Figure 4:
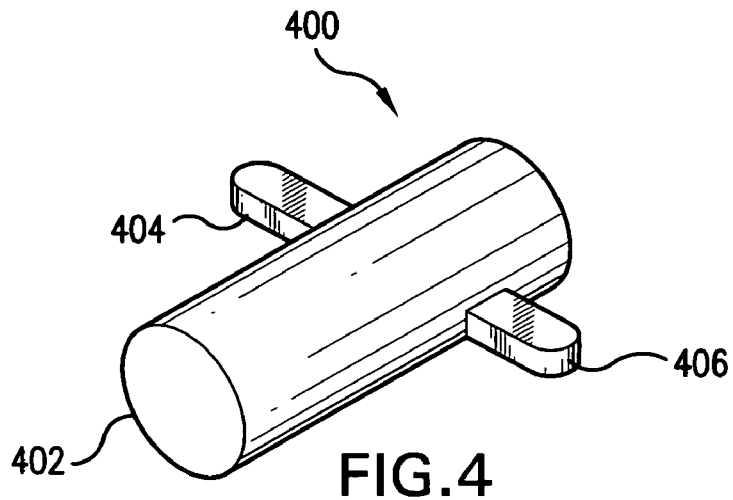
FIG. 4 illustrates a ferrule in accordance with another embodiment of the present invention, wherein the ferrule bears protrusions on its outer surface.

FIG. 4 illustrates a ferrule 400, in accordance with yet another embodiment of the present invention, wherein ferrule 400 bears protrusions on its outer surface. Protrusions 404 and 406 present on a housing 402 of ferrule 400 are used to align ferrule 400 and prevent motion (rotational and translational) of ferrule 400 relative to a support in which ferrule 400 is placed. The protrusions 404 and 406 also limit the translational movement of the ferrule 400. Further, the orientation of the optical fiber with respect to the protrusions 404 and 406 is fixed. This is useful in applications requiring either a polarizing fiber or polarization maintaining fiber (PMF). The protrusions 404 and 406 hold ferrule 400 in housing 402 such that the preferred ("fast" or "slow") axis of the optical fiber lies either perpendicular or parallel to housing 402. In different embodiments of the present invention, the shape of protrusions 404 and 406 can be conical, square, circular, semi-circular, or a combination thereof. It would be apparent to one skilled in the art that protrusions of different shapes may be employed without deviating from the spirit and scope of the present invention.

The aforesaid embodiment of the present invention describes a ferrule with two protrusions by way of example, without limiting the scope of the present invention. In various embodiments of the present invention, a desirable number of protrusions may be employed including, for example, at least one protrusion. In another embodiment of the present invention, the protrusions can be placed on the outer surface and along the axis of the ferrule at regular intervals. In yet another embodiment of the present invention, the protrusions can be placed on the outer surface and along circular cross-section of the ferrule at regular intervals.

Figure 5:
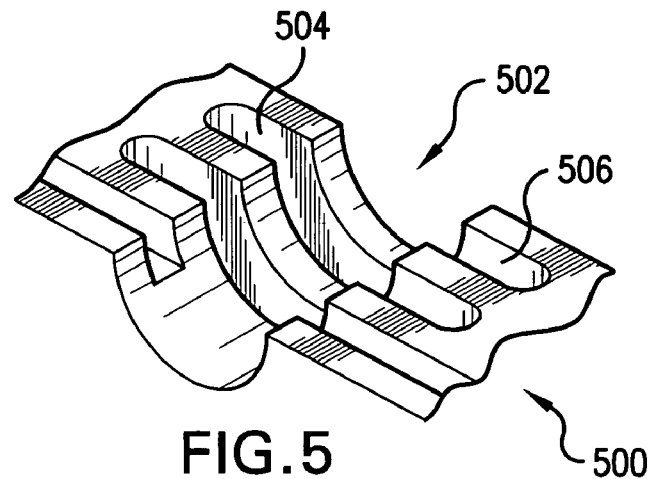
FIG. 5 is an illustration of a portion of a support in accordance with another embodiment of the present invention.

FIG. 5 is an illustration of a portion of a support in accordance with an embodiment of the present invention. The support 500 contains a cavity 502 for holding a ferrule. The support 500 also contains two grooves 504 and 506 that are opposite to each other such that the protrusions of the ferrule 400 are seated in the grooves 504 and 506. In various embodiments, the number of grooves in the support may correspond with the number of protrusions in the ferrule.

In one embodiment of the present invention, a support may comprise of two flaps, namely, a top flap and a bottom flap, such that the ferrule is encapsulated within the two flaps. In an alternate embodiment, the support can be a tubular structure, which houses a ferrule having retractable protrusions, to facilitate insertion of the ferrule in the cavity 502 of the support.

Figure 6:
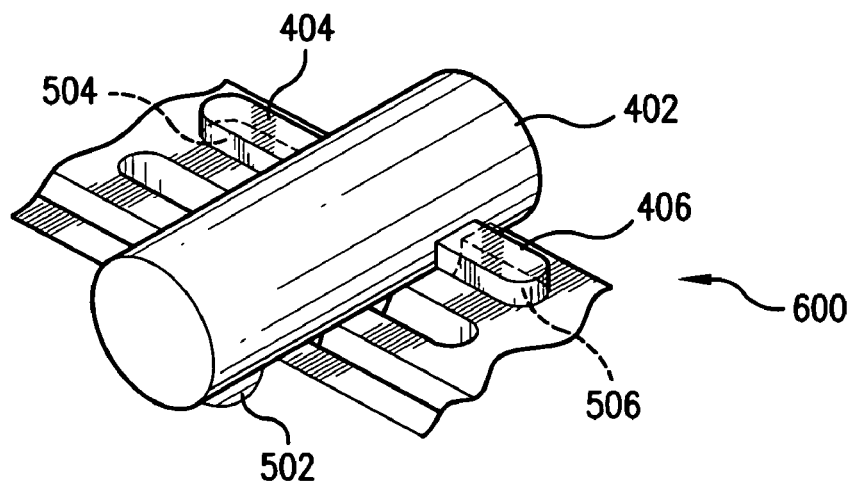
FIG. 6 is an illustration of a ferrule-support assembly in accordance with another embodiment of the present invention.

FIG. 6 is an illustration of a ferrule and support assembly 600 in accordance with an embodiment of the present invention. Assembly 600 illustrates ferrule 400, with protrusions 404 & 406 on housing 402, wherein the ferrule is placed in support 500. When ferrule 400 is placed in support 500, grooves 504 & 506 of support 500 seat protrusions 404 & 406 of the ferrule, respectively, to hold ferrule 400 firmly in support 500 and thereby prevent motion (rotational and translational) of the ferrule 400 relative to the support 500.

In another embodiment of the present invention, the ferrule may have a combination of notches and protrusions on its surface, with corresponding protrusions and grooves on the support. It would be apparent to one skilled in the art that notches and/or protrusions of various sizes, shapes, and orientations may be employed, without deviating from the spirit and scope of the present invention. Further, a variety of arrangements of the notches and/or grooves on the ferrule surface may be used in various embodiments, as per the desired application.

It would further be apparent to one skilled in the art that the present invention is not restricted to ferrules with a circular cross section, but can be used in conjunction with any ferrule that lends itself to rotational or translational motion while it is placed in the support.

Although the present invention is described with the reference to the preferred embodiments, however, the scope of the present invention is not limited to the same. It will be appreciated by a person skilled in the art that several other variations of the present invention can exist and fall within the scope of the present invention.

What is claimed is:

1. A combination comprising:
   a ferrule;
   an external support having separable first and second portions with a cavity defined between said first and second portions for receiving the ferrule;
   an optical fiber fixedly mounted inside the ferrule;
   a notch pre-existing on the surface of said ferrule before assembly into the external support; and
   said support including a protrusion integral with and extending from at least one of said first and second portions of the support, said protrusion pre-existing on said external support before assembly of the ferrule into the external support where said protrusion engages with the notch during assembly of the ferrule into the support so as to align the ferrule with the external support during assembly and prevent rotational movement of the ferrule relative to said support and twisting of the optical fiber.

2. A combination as defined in claim 1, wherein said notch for engaging includes a first groove on said ferrule substantially orthogonal to the longitudinal axis of the ferrule.

3. A combination as defined in claim 2, wherein said ferrule has a planar, circular end face with the stripped end of said fiber being disposed in the center thereof, and said groove for engaging further includes a second groove on said ferrule parallel to said first groove and lying on a plane parallel to said planar end face.

4. A combination as defined in claim 2, wherein said groove has two parallel planar surfaces for engaging with respective planar surfaces on said support.

5. A combination as defined in claim 4, wherein said groove has a planar bottom surface orthogonal to said parallel planar surface.

6. A combination as defined in claim 1 further comprising a plurality of notches engaging with the external support for the ferrule so as to prevent translational movement of the ferrule relative to said support.

7. A combination as defined in claim 1 further comprising a plurality of notches disposed on an outer surface of the ferrule along circular cross-section of the ferrule at regular intervals.

8. A combination as defined in claim 1 wherein said notch further comprises a pair of notches disposed on opposing sides of the ferrule.

9. A combination as defined in claim 8 where each notch of the pair of notches further comprises a planar bottom surface defined by a first axis that is parallel to a longitudinal axis of the ferrule and a second axis that is orthogonal to the longitudinal axis of the ferrule, said planar bottom surface preventing rotational movement.

10. A combination as defined in claim 8 wherein each notch of the pair of notches further comprises a pair of planar opposing sides defined by a pair of axis that are both perpendicular to the longitudinal axis of the ferrule, said pair of opposing sides preventing translational movement.

11. A combination comprising:
    a ferrule,
    a two-piece support with an internal cavity defined between first and second portions of the two-piece support for receiving the ferrule;
    an optical fiber fixedly mounted inside the ferrule;
    the surface of one of said ferrule and said support having a plurality of protrusions integral with the surface of the one of said ferrule and said support where the plurality of protrusions are pre-existing on the one of said ferrule and said support; and
    a plurality of corresponding grooves pre-existing on the other of said ferrule and said support for engaging with the plurality of protrusions during assembly of the ferrule into the support so as to align the ferrule with the support during assembly and prevent rotational movement of the ferrule relative to said support and twisting of the optical fiber.

12. A combination as defined in claim 11 further comprising the plurality of protrusions disposed on the surface of said ferrule for engaging with the external support for the ferrule so as to prevent translational movement of the ferrule relative to said support.

13. A combination as defined in claim 11 wherein said plurality of protrusions further comprises a pair of protrusions disposed on opposing sides of the ferrule.

14. A combination as defined in claim 13 where each protrusion of the pair of protrusions further comprises a first pair of opposing planar surfaces defined by a first axis that is parallel to a longitudinal axis of the ferrule and a second axis that is orthogonal to the longitudinal axis of the ferrule, said first pair of planar surfaces preventing rotational movement.

15. A combination as defined in claim 13 wherein each protrusion of the pair of protrusions further comprises a second pair of planar opposing surfaces defined by a pair of axis that are both perpendicular to the longitudinal axis of the ferrule, said second pair of opposing surfaces preventing translational movement.

16. A combination as defined in claim 12 further comprising disposing the plurality of protrusions on an outer surface along an axis of the ferrule at regular intervals.

17. A combination as in claim 1 wherein the support further comprises an optical transceiver.

18. A combination as in claim 11 wherein the support further comprises an optical transceiver.

19. The combination as in claim 11 further comprising a preferred axis of the optical fiber lying either perpendicular or parallel to a housing of the ferrule.

20. A method of forming a combination comprising:
    forming a ferrule having a cylindrical shape, a central longitudinal bore and an integral notch disposed on an outer surface of the cylindrical shape;
    mounting an optical fiber within the central longitudinal bore;
    forming a housing having an internal cavity with a integral protrusion that is complementary to the notch of the ferrule; and
    mounting the ferrule within the cavity where the protrusion of the housing engages the notch of the ferrule during mounting of the ferrule within the cavity so as to align the ferrule to the housing and to prevent rotational movement of the ferrule relative to said housing and twisting of the optical fiber.

* * * * *